(12) United States Patent
Arai et al.

(10) Patent No.: US 9,331,729 B2
(45) Date of Patent: May 3, 2016

(54) MOBILE TERMINAL TEST DEVICE AND MOBILE TERMINAL TEST METHOD

(71) Applicant: ANRITSU CORPORATION, Atsugi-shi, Kanagawa (JP)

(72) Inventors: Shigeharu Arai, Kanagawa (JP); Kengo Kikuchi, Kanagawa (JP); Toshiyuki Watanabe, Kanagawa (JP); Takaaki Kamisawa, Kanagawa (JP); Koji Fukazawa, Kanagawa (JP)

(73) Assignee: ANRITSU CORPORATION, Atsugi-Shi (JP)

( * ) Notice: Subject to any disclaimer, the term of this patent is extended or adjusted under 35 U.S.C. 154(b) by 0 days.

(21) Appl. No.: 14/595,359

(22) Filed: Jan. 13, 2015

(65) Prior Publication Data

US 2015/0215938 A1    Jul. 30, 2015

(30) Foreign Application Priority Data

Jan. 30, 2014  (JP) .................................. 2014-015359

(51) Int. Cl.
| | |
|---|---|
| *H04W 72/00* | (2009.01) |
| *H04B 1/38* | (2015.01) |
| *H04B 17/00* | (2015.01) |
| *H04B 17/17* | (2015.01) |
| *H04B 17/23* | (2015.01) |
| *H04L 5/00* | (2006.01) |

(52) U.S. Cl.
CPC .............. *H04B 1/38* (2013.01); *H04B 17/0085* (2013.01); *H04B 17/17* (2015.01); *H04B 17/23* (2015.01); *H04L 5/0048* (2013.01)

(58) Field of Classification Search
None
See application file for complete search history.

(56) References Cited

U.S. PATENT DOCUMENTS

| 6,181,951 | B1 * | 1/2001 | Garner ................. | H04W 24/00 455/423 |
|---|---|---|---|---|
| 8,629,700 | B2 * | 1/2014 | Feng ..................... | H03L 7/0898 327/147 |
| 2006/0148429 | A1 * | 7/2006 | Inogai ................ | H04B 17/0087 455/115.1 |

FOREIGN PATENT DOCUMENTS

| JP | 2013-198135 A | | 9/2013 |
|---|---|---|---|
| JP | 2013198135 | * | 9/2013 |

\* cited by examiner

*Primary Examiner* — Adolf Dsouza
(74) *Attorney, Agent, or Firm* — Pearne & Gordon LLP

(57) ABSTRACT

A frequency variation provider gives a predetermined frequency variation when a situation in which a mobile terminal approaches or is separated from a base station is simulated to a downlink (DL) signal which is transmitted to a mobile terminal by a transmitting unit. A receiving unit receives an uplink (UL) signal output from the mobile terminal which has received the DL signal and converts the UL signal into a baseband signal. A frequency variation detector detects a frequency variation of the UL signal from the baseband signal. A frequency corrector corrects the frequency of a local signal which is used by the receiving unit to obtain the baseband signal, on the basis of the detected frequency variation. A variation characteristic display displays the characteristics of the frequency variation of the UL signal transmitted from the mobile terminal on a display unit.

6 Claims, 3 Drawing Sheets

Frequency variation given to DL signal

MOBILE TERMINAL TEST DEVICE AND MOBILE TERMINAL TEST METHOD

TECHNICAL FIELD

The present invention relates to a technique for testing mobile terminals, such as mobile phones or smartphones, and more particularly, to a technique for testing in real time the response of a mobile terminal, which is moving at high speed, to a variation in the reception frequency of a downlink (hereinafter, abbreviated to DL) signal due to a Doppler effect when the mobile terminal receives the DL signal from a base station.

BACKGROUND ART

A mobile communication standard 3GPP defines a test in a situation in which there is a large variation in the frequency of a DL signal from a base station.

An example of the test is a high speed train (HST) test. In the HST test, a test device including a fading simulator simulates a situation in which a mobile terminal moves at high speed together with a high-speed moving body, such as a bullet train, and checks whether communication with the mobile terminal can be correctly performed.

In this case, the reception frequency of the mobile terminal with respect to the DL signal increases due to a Doppler effect in a situation in which the mobile terminal approaches the base station. The reception frequency of the mobile terminal with respect to the DL signal decreases due to the Doppler effect in a situation in which the mobile terminal is separated from the base station.

The transmission frequency of an uplink (hereinafter, abbreviated to UL) signal which is transmitted from the mobile terminal to the base station is determined on the basis of the reception frequency of the DL signal in the terminal. However, the detailed structure of the frequency determination process is not defined by the 3GPP standard and varies depending on the terminal manufacturer.

Therefore, it is possible to confirm the frequency follow-up capability of the mobile terminal by transmitting a DL signal to which the same frequency variation as that caused by the Doppler effect to a mobile terminal to be tested, which is fixed at a predetermined position, receiving the UL signal which is transmitted from the mobile terminal in response to the DL signal, storing waveform data for the UP signal, analyzing the stored waveform data to check a frequency variation of the UL signal, and contrasting the frequency variation given to the DL signal with the frequency variation calculated from the waveform data of the UL signal.

For example, Patent Document 1 discloses a technique which tests the mobile terminal using a fading simulator.

RELATED ART DOCUMENT

Patent Document

[Patent Document 1] Japanese Unexamined Patent Application Publication No. 2013-198135

DISCLOSURE OF THE INVENTION

Problem that the Invention is to Solve

However, in the above-mentioned process which stores the waveform data of the UL signal from the mobile terminal and analyzes the waveform data to calculate the frequency variation, frequency variation data is not obtained in real time and it is difficult to effectively perform the test. In addition, since the capacity of a memory for storing the waveform data is limited, it is difficult to measure the frequency variation for a long period of time.

The invention has been made in order to solve the above-mentioned problems and an object of the invention is to provide a mobile terminal test device and a mobile terminal test method which can measure the frequency variation of a UL signal in real time and for a long period of time, for example, during an HST test.

Means for Solving the Problem

In order to achieve the above-mentioned object, according to a first aspect of the invention, a mobile terminal test device includes: a transmitting/receiving unit (21) including a transmitting unit (22) that transmits a downlink signal to a mobile terminal to be tested and a receiving unit (24) that receives an uplink signal output from the mobile terminal which has received the downlink signal and converts the uplink signal into a baseband signal; a test processing unit (30) that simulates a base station, transmits and receives signals to and from the mobile terminal through the transmitting/receiving unit, and performs a process required to test the mobile terminal; a display unit (40) that displays a test result; frequency variation giving means (25a) for giving a predetermined frequency variation when a situation in which the mobile terminal that moves together with a high-speed moving body approaches or is separated from the base station is simulated to the downlink signal which is transmitted to the mobile terminal by the transmitting unit; frequency variation detection means (25b) for, when the downlink signal to which the predetermined frequency variation is given is transmitted from the transmitting unit, receiving the baseband signal obtained by the receiving unit and detecting a frequency variation of the uplink signal; frequency correction means (25c) for correcting a frequency of a local signal which is used by the receiving unit to obtain the baseband signal, on the basis of the frequency variation detected by the frequency variation detection means; and variation characteristic display means (33) for displaying, on the display unit, a characteristic of the frequency variation of the uplink signal that is transmitted from the mobile terminal in response to the downlink signal to which the predetermined frequency variation is given, on the basis of the frequency variation detected by the frequency variation detection means.

According to a second aspect of the invention, in the mobile terminal test device according to the first aspect, the frequency correction means may be configured to change a frequency correction interval of the local signal, correct the frequency of the local signal at a first interval corresponding to a rate of the predetermined frequency variation when the frequency variation giving means gives the predetermined frequency variation to the downlink signal, and correct the frequency of the local signal at a second interval which is longer than the first interval when the frequency variation giving means does not give the predetermined frequency variation to the downlink signal.

According to a third aspect of the invention, in the mobile terminal test device according to the first aspect, the variation characteristic display means may display a characteristic of the predetermined frequency variation which is given to the downlink signal by the frequency variation giving means so as to be contrasted with the characteristic of the frequency variation of the uplink signal.

According to a fourth aspect of the invention, in the mobile terminal test device according to the first aspect, the transmitting/receiving unit may be configured to perform communication based on a CDMA system with the mobile terminal to be tested, and the frequency variation detection means may detect a frequency variation of a pilot signal in a specific channel among the baseband signals obtained by code inverse diffusion and a quadrature demodulation process in the receiving unit.

According to a fifth aspect of the invention, a mobile terminal test method includes: a step of transmitting, to a mobile terminal to be tested, a downlink signal to which a predetermined frequency variation when a situation in which the mobile terminal that moves together with a high-speed moving body approaches or is separated from a base station is simulated is given; a step of receiving an uplink signal output from the mobile terminal that has received the downlink signal to which the predetermined frequency variation has been given and converting the uplink signal into a baseband signal; a step of detecting a frequency variation of the uplink signal from the baseband signal; a step of correcting a frequency of a local signal which is used to obtain the baseband signal, on the basis of the detected frequency variation; and a step of for displaying a characteristic of the frequency variation of the uplink signal that is transmitted from the mobile terminal in response to the downlink signal to which the predetermined frequency variation is given, on the basis of the detected frequency variation.

According to a sixth aspect of the invention, in the mobile terminal test method according to the fifth aspect, the step of correcting the frequency of the local signal may correct the frequency of the local signal at a first interval corresponding to a rate of the predetermined frequency variation when the predetermined frequency variation is given to the downlink signal and may correct the frequency of the local signal at a second interval which is longer than the first interval when the predetermined frequency variation is not given to the downlink signal.

According to a seventh aspect of the invention, in the mobile terminal test method according to the fifth aspect, the step of displaying the characteristic of the frequency variation of the uplink signal may display a characteristic of the predetermined frequency variation which is given to the downlink signal in the step of transmitting the downlink signal to the mobile terminal to be tested so as to be contrasted with the characteristic of the frequency variation of the uplink signal.

According to an eighth aspect of the invention, in the mobile terminal test method according to the fifth aspect, communication based on a CDMA system may be performed with the mobile terminal to be tested, and the step of detecting the frequency variation may detect a frequency variation of a pilot signal in a specific channel among the baseband signals obtained by code inverse diffusion and a quadrature demodulation process.

Advantage of the Invention

As such, in the invention, a predetermined frequency variation when a situation in which a mobile terminal that moves together with a high-speed moving body approaches or is separated from a base station is simulated is given to a downlink signal. The downlink signal is transmitted to the mobile terminal to be tested. An uplink signal output from the mobile terminal which has received the downlink signal is received and is converted into a baseband signal. A frequency variation of the uplink signal is detected from the baseband signal. The frequency of a local signal which is used to obtain the baseband signal is corrected on the basis of the detected frequency variation. The characteristics of the frequency variation of the uplink signal that is transmitted from the mobile terminal in response to the downlink signal to which the predetermined frequency variation is given are displayed on the basis of the detected frequency variation.

That is, the frequency variation of the uplink signal which needs to be analyzed for, for example, an HST test is detected as data for correcting the frequency shift of the baseband signal due to the frequency variation and the characteristics of the frequency variation are displayed on the basis of the detected frequency variation. Therefore, it is not necessary to store the waveform data of the uplink signal and to analyze the waveform data and it is possible to continuously perform, for example, the HST test in real time and for a long period of time.

BEST MODE FOR CARRYING OUT THE INVENTION

Hereinafter, an embodiment of the invention will be described with reference to the drawings.

Figure 1:
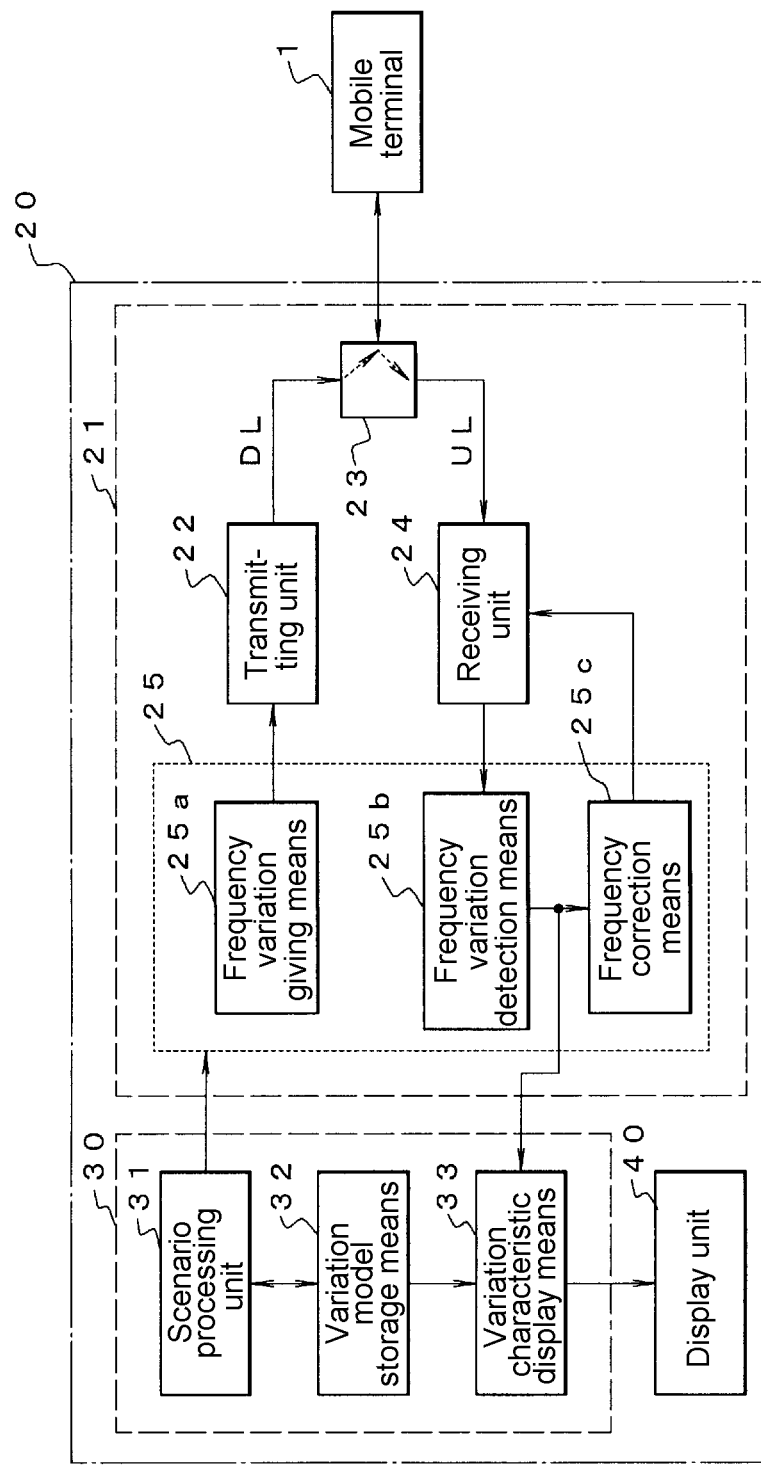
FIG. 1 is a diagram illustrating the structure of an embodiment of the invention.

FIG. 1 shows the structure of a mobile terminal test device (hereinafter, simply referred to as a test device) 20 to which the invention is applied.

The test device 20 includes a transmitting/receiving unit 21, a test processing unit 30, and a display unit 40. The transmitting/receiving unit 21 includes a transmitting unit 22, a coupler 23, a receiving unit 24, and a communication control unit 25.

The transmitting unit 22 receives, for example, a baseband signal and a control signal from the communication control unit 25 which receives an instruction from the test processing unit 30, generates a radio-frequency downlink (DL) signal required for a test, and transmits the radio-frequency DL signal to a mobile terminal 1 to be tested through the coupler 23.

The transmitting unit 22 performs a quadrature modulation process on the baseband signal input from the communication control unit 25 and generates the DL signal in a radio frequency band which is used for communication with the mobile terminal 1. However, in some cases, frequency conversion is performed in the transmitting unit 22. In addition, in some cases, a process unique to the communication system is included in the structure of the transmitting unit 22. For example, in a CDMA system, a code diffusion process is performed on the baseband signal and then the quadrature modulation process is performed on the baseband signal. The transmitting unit 22 is configured such that it can change the frequency of a local signal for frequency conversion or a local signal used for the quadrature modulation process to change the frequency of the DL signal.

The mobile terminal 1 receives the DL signal which is output from the transmitting unit 22 through the coupler 23 and outputs an uplink (UL) signal as a response to the DL signal. The UL signal is input to the receiving unit 24 through the coupler 23.

Figure 2:
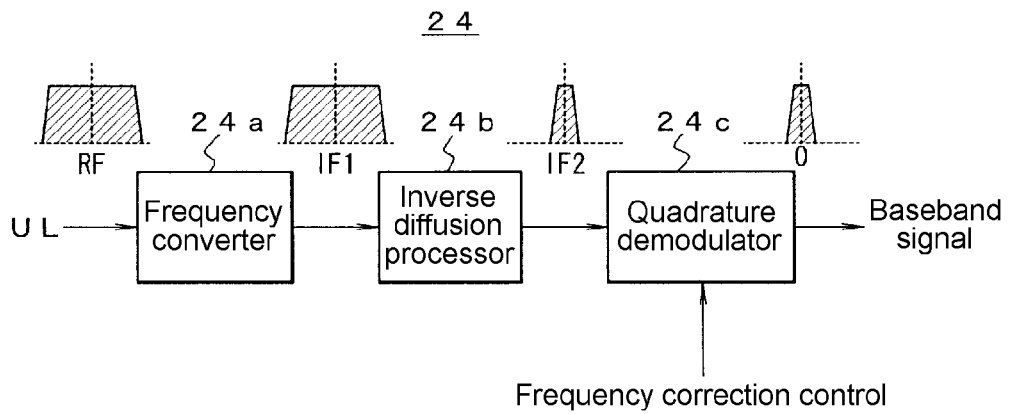
FIG. 2 is a diagram illustrating the structure of a main portion of the embodiment.

The receiving unit 24 receives the input UL signal and performs a frequency conversion process and a quadrature demodulation process to convert the UL signal into the baseband signal. Specifically, in the CDMA system, as shown in FIG. 2, the UL signal (the UL signal subjected to the code diffusion process) is input to a heterodyne frequency converter 24a and is converted into a signal with a frequency in a predetermined intermediate frequency band. An inverse diffusion processor 24b restores the signal with the frequency in the intermediate frequency band to a signal before diffusion. The signal is given to a quadrature demodulator 24c and is converted into the baseband signal. When the code inverse diffusion process is performed as in the CDMA system, a wide band width (about 4 MHz) before inverse diffusion is restored to a narrow band width of about 15 kHz and a frequency variation is maintained. Therefore, a frequency variation of a few tens of hertz to a few hundreds of hertz is preferably detected with a signal in a frequency band of about 15 kHz and it is easy to detect the variation, as compared to a case in which a frequency variation in a wide frequency range of a few tens of hertz to a few hundreds of hertz is detected.

In other systems, for example, in an LTE system, preprocessing corresponding to a frequency and time division system is performed and a quadrature demodulation process is performed to convert the UL signal transmitted from the mobile terminal 1 to be tested into the baseband signal.

The baseband signals include I and Q signals which are orthogonal to each other. A point on an orthogonal coordinate system which is determined by the value of the I signal and the value of the Q signal is the symbol coordinates of data. For example, when a signal which has constant I and Q values (for example, I=Q=1) and is constantly output, such as a pilot signal (UL-DPCCH) included in a UL signal in the CDMA system, is received and there is no reception frequency shift, the coordinates of a symbol point which is obtained for each period (sampling period) of a local signal are fixed to (I, Q) and the symbol point is in a symbol synchronized state. However, when there is a reception frequency shift, the values of I and Q are changed by the shifted frequency and the coordinates of the symbol point move.

Therefore, the movement of the symbol point obtained from the baseband signal which is constantly output, such as the pilot signal, is monitored to check whether the symbol synchronization of the receiving unit 24 with the received signal is performed. When the symbol synchronization is not performed, the frequency of the local signal is corrected to maintain the synchronized state. In systems other than the CDMA system, a signal which is constantly output among the UL signals is used to detect the frequency variation.

Here, when the position of the symbol point is changed by $\Delta\theta$ (radian) for a measurement interval $\Delta T$ (seconds), a frequency shift $\Delta F$ (Hz) is represented by $\Delta F=\Delta\theta/(2\pi\Delta T)$.

For example, when the measurement interval $\Delta T$ is 10 milliseconds and the phase variations $\Delta\theta$ are $\pi/2$, $\pi$, and $2\pi$, the frequency shifts $\Delta F$ are 25 Hz, 50 Hz, and 100 Hz, respectively.

The communication control unit 25 receives instructions from the test processing unit 30 and performs various types of control on the transmitting unit 22 and the receiving unit 24. When the HST test is performed, the communication control unit 25 includes frequency variation giving means 25a for giving a frequency variation to the DL signal. The frequency variation giving means 25a gives a predetermined variation to the frequency of the local signal used for the frequency conversion process or the quadrature modulation process in the transmitting unit 22, on the basis of the content of the test designated by the test processing unit 30. In this way, the frequency variation giving means 25a gives the DL signal a predetermined frequency variation when a situation in which a mobile terminal that moves together with a high-speed moving body approaches or is separated from the base station is simulated.

The communication control unit 25 further includes: frequency variation detection means 25b for receiving the baseband signal obtained by the receiving unit 24 and for detecting the frequency variation of the UL signal when the DL signal to which the predetermined frequency variation is given by the frequency variation giving means 25a is transmitted from the transmitting unit 22; and frequency correction means 25c for correcting the frequency of the local signal which is used for the frequency conversion process or the quadrature demodulation process in order to obtain the baseband signal in the receiving unit 24 on the basis of the detected frequency variation.

Specifically, the frequency variation detection means 25b monitors the movement of the symbol point obtained from the baseband signal as described above and detects the frequency variation of the UL signal. The frequency correction means 25c corrects the frequency of the local signal used for the frequency conversion process or the quadrature demodulation process in the receiving unit 24 such that the symbol synchronized state is maintained. In practice, the frequency variation is about a few hundreds of hertz and is significantly lower than the transmission/reception frequency which is allocated between 800 MHz to 2 GHz. Therefore, the frequency correction process is performed on a local signal with a relatively low frequency which is used for the quadrature demodulation process.

The frequency variation detection means 25b and the frequency correction means 25c are configured so as to operate in a mode which corrects the reception frequency shift, without intentionally giving a frequency variation to the DL signal, as well as the mode which intentionally gives a frequency variation to the DL signal for a test as in the HST test.

However, in the case of the mode which corrects a reception frequency shift, without giving a frequency variation to the DL signal, when the correction interval is short, excessive correction is performed and a large frequency variation occurs. Therefore, for example, the correction needs to be slowly performed at a long interval of about a few seconds.

In contrast, when a relatively large frequency variation in a short time as in the HST test is assumed, the correction is not completed for an interval of about a few seconds.

In order to solve the problem, the following methods can be used: a method in which the frequency variation detection interval of the frequency variation detection means 25b and the frequency correction interval of the frequency correction means 25c can be changed so as to be operatively associated with each other, depending on the test mode; and a method in which the frequency variation detection interval does not depend on the test mode, but is fixed to a small value and only the frequency correction interval can be changed depending on the test mode.

In the former method, in the mode in which a frequency variation is given, the frequency variation detection and the frequency correction are performed at a first short interval (for example, 10 milliseconds) corresponding to the rate of the given frequency variation. In the mode in which no frequency variation is given, the frequency variation detection and the frequency correction are performed at a second interval (for example, a few seconds) which is longer than the first interval.

In the latter method, in the mode in which a frequency variation is given, the frequency variation detection and the frequency correction are performed at the first interval (for example, 10 milliseconds). In the mode in which no frequency variation is given, the frequency variation detection is performed at the first interval and the frequency correction is performed at the second interval (for example, a few seconds) which is longer than the first interval. That is, at least the correction interval of the frequency correction means 25c is preferably changed depending on the test mode.

The test processing unit 30 simulates a base station, communicates with the mobile terminal 1 through the transmitting/receiving unit 21, and performs various types of processes required to test the mobile terminal 1. Here, a structure for performing the HST test will be described.

The test processing unit 30 includes a scenario processing unit 31 that stores scenario information in which data, such as procedures or conditions required for various tests for the mobile terminal, is described and performs processing on the basis of the scenario information. The user can arbitrarily generate the scenario information. When the user uses an operating unit (not shown) to designate scenario information corresponding to desired test content, the scenario processing unit 31 performs processing and data required for the test is output.

The scenario information related to the HST test will be described in detail. Frequency variation information to be given to the DL signal is designated to the transmitting/receiving unit 21 and the transmitting/receiving unit 21 transmits the DL signal to which the frequency variation is added.

Here, for example, in an HST test which simulates a situation in which a mobile terminal that moves together with a high-speed moving body, such as a bullet train which travels at a high speed, approaches or is separated from the base station, a reception frequency fr when the mobile terminal which approaches the base station at a speed of v per hour receives a DL signal with a frequency ft is represented by fr=ft·c/(c−v) (Hz) (where c is the speed of an electromagnetic wave and is $3 \times 10^8$ m/s).

Specifically, when the moving speed v of the mobile terminal is 300 km/h and the frequency ft of the DL signal is 2 GHz, the reception frequency fr is about 2,000,000,555 (Hz) and shifts to a frequency that is about 555 Hz higher than the transmission frequency.

Conversely, the reception frequency fr when the mobile terminal which is moving away from the base station at the speed v per hour receives the DL signal with the frequency ft is represented by fr=ft·c/(c+v) (Hz). When the reception frequency fr is calculated in the same numerical example as described above, the reception frequency fr shifts to a frequency that is about 555 Hz lower than a transmission frequency of 2 GHz.

Figure 3:
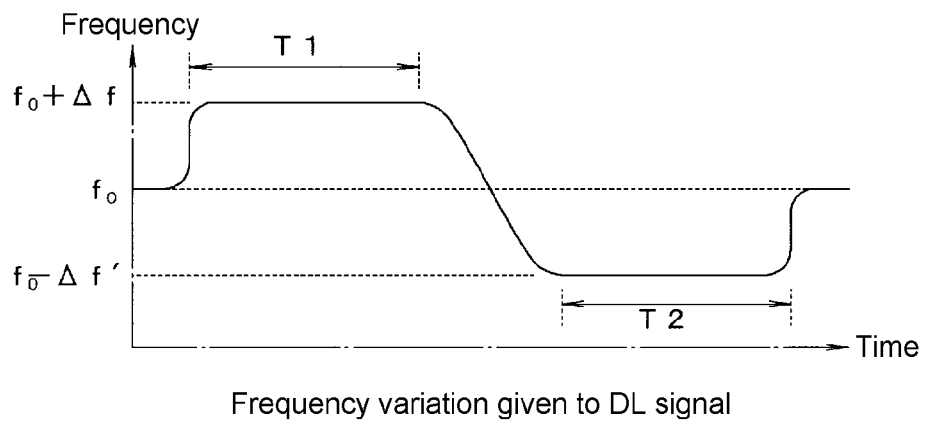
FIG. 3 is a diagram illustrating an example of a frequency variation given to a downlink signal.

Therefore, in order to simulate this situation, as shown in FIG. 3, a state in which the frequency f(DL) of the DL signal output from the transmitting unit 22 is set to be higher than a regular frequency f0 (=2 GHz) by Δf (=555 Hz) is maintained for a predetermined period of time T1. Then, the frequency f(DL) is continuously reduced to the regular frequency f0 at a predetermined rate of change. Then, the frequency f(DL) is continuously reduced to a frequency that is lower than the regular frequency f0 by Δf (=555 Hz) while maintaining the rate of change. Then, the frequency is maintained for a predetermined period of time T2. Since the speed v of the mobile terminal is significantly lower than the speed c of the electromagnetic wave, the shift frequency Δf when the mobile terminal approaches the base station is substantially equal to the shift frequency Δf' when the mobile terminal is separated from the base station.

Variation model storage means 32 stores plural types of frequency variation models shown in FIG. 3 having, for example, a moving speed or a communication frequency as a parameter. When the scenario processing unit 31 designates a frequency variation model used for a test, a parameter corresponding to the designated frequency variation model is read from the variation model storage means 32 and is given to the communication control unit 25. A desired frequency variation is then given.

Variation characteristic display means 33 displays, on the display unit 40, the characteristics of the frequency variation of the UL signal that is transmitted from the mobile terminal 1 in response to the DL signal to which a predetermined frequency variation is given, while storing data for the frequency variation which is detected in time series by the frequency variation detection means 25b of the communication control unit 25. In this case, the storage data indicates a variation in the frequency and is obtained at an interval of about 10 milliseconds, as described above. Therefore, a small amount of data can be stored even though measurement is performed for a long period of time.

The variation characteristic display means 33 has a mode in which only the characteristics of the frequency variation of the UL signal are displayed and a mode in which the characteristics of the predetermined frequency variation that is given to the DL signal by the frequency variation giving means 25a are displayed so as to be contrasted with the characteristics of the frequency variation of the UL signal. The user uses the operating unit (not shown) to designate the mode for displaying the characteristics.

Figure 4:
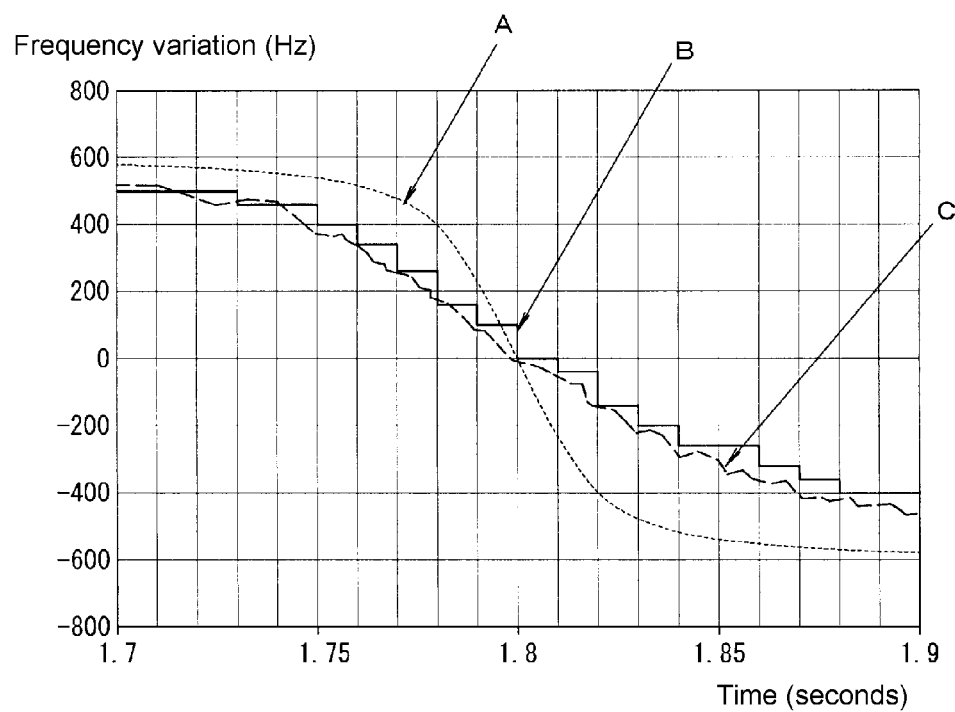
FIG. 4 is a diagram illustrating an example of the display of a measurement result.

FIG. 4 shows an example of the characteristics of the frequency variation displayed on the display unit 40. The comparison between a characteristic A of the frequency variation given to the DL signal and a characteristic B of the frequency variation of the UL signal shows that the frequency variation with the characteristic B is less than the frequency variation with the characteristic A.

A characteristic C shown in FIG. 4 is obtained by performing thorough FFT analysis on the waveform data of the UL signal obtained by another device. The characteristic B of the frequency variation obtained by the test device 20 according to the embodiment is substantially identical to the characteristic C and the HST test for the mobile terminal 1 is performed with sufficiently high accuracy. In addition, the characteristic C shown in FIG. 4 is described in contrast with the characteristic B of the frequency variation obtained by the test device 20 according to the embodiment, but is not displayed on the display unit 40 of the test device 20 according to the embodiment.

The characteristics shown in FIG. 4 overlap on a graph on the basis of the regular frequencies of the DL signal and the UL signal in a state in which there is no Doppler shift. The actual frequency is shifted up and down by the difference between the frequency of the DL signal and the frequency of the UL signal. Even when the characteristics are displayed in the shifted state, they can be contrasted with each other.

The test device 20 receives the UL signal, obtains the baseband signal from the UL signal, detects the frequency variation from the baseband signal, and displays variation characteristics. Therefore, it is not necessary to perform the process of obtaining waveform data and performing thorough FFT analysis to calculate frequency variation characteristics.

It is possible to obtain the HST test result in real time and to considerably improve test efficiency.

In addition, although not shown in the drawings, the frequency variation characteristic B with respect to the same frequency variation characteristic A varies depending on the manufacturer or type of the mobile terminal and different HST test results are obtained for each type of device. Therefore, it was verified that, even when thorough analysis was not performed on the waveform data, it was possible to accurately grasp the difference between the characteristics of mobile terminals for the HST test.

DESCRIPTION OF REFERENCE NUMERALS AND SIGNS

20: MOBILE TERMINAL TEST DEVICE
21: TRANSMITTING/RECEIVING UNIT
22: TRANSMITTING UNIT
23: COUPLER
24: RECEIVING UNIT
25: COMMUNICATION CONTROL UNIT
25a: FREQUENCY VARIATION GIVING MEANS
25b: FREQUENCY VARIATION DETECTION MEANS
25c: FREQUENCY CORRECTION MEANS
30: TEST PROCESSING UNIT
31: SCENARIO PROCESSING UNIT
32: VARIATION MODEL STORAGE MEANS
33: VARIATION CHARACTERISTIC DISPLAY MEANS
40: DISPLAY UNIT

What is claimed is:

1. A mobile terminal test device comprising:
a transmitting/receiving unit including a transmitting unit that transmits a downlink signal to a mobile terminal to be tested and a receiving unit that receives an uplink signal output from the mobile terminal which has received the downlink signal and converts the uplink signal into a baseband signal;
a test processing unit that simulates a base station, transmits and receives signals to and from the mobile terminal through the transmitting/receiving unit, and performs a process required to test the mobile terminal;
a display unit that displays a test result;
frequency variation giving means for giving a predetermined frequency variation when a situation in which the mobile terminal that moves together with a high-speed moving body approaches or is separated from the base station is simulated to the downlink signal which is transmitted to the mobile terminal by the transmitting unit;
frequency variation detection means for, when the downlink signal to which the predetermined frequency variation is given is transmitted from the transmitting unit, receiving the baseband signal obtained by the receiving unit and detecting a frequency variation of the uplink signal;
frequency correction means for correcting a frequency of a local signal which is used by the receiving unit to obtain the baseband signal, on the basis of the frequency variation detected by the frequency variation detection means; and
variation characteristic display means for displaying, on the display unit, a characteristic of the frequency variation of the uplink signal that is transmitted from the mobile terminal in response to the downlink signal to which the predetermined frequency variation is given, on the basis of the frequency variation detected by the frequency variation detection means,
wherein the frequency correction means is configured to change a frequency correction interval of the local signal, corrects the frequency of the local signal at a first interval corresponding to a rate of the predetermined frequency variation when the frequency variation giving means gives the predetermined frequency variation to the downlink signal, and corrects the frequency of the local signal at a second interval longer than the first interval when the frequency variation giving means does not give the predetermined frequency variation to the downlink signal.

2. A mobile terminal test device comprising:
a transmitting/receiving unit including a transmitting unit that transmits a downlink signal to a mobile terminal to be tested and a receiving unit that receives an uplink signal output from the mobile terminal which has received the downlink signal and converts the uplink signal into a baseband signal;
a test processing unit that simulates a base station, transmits and receives signals to and from the mobile terminal through the transmitting/receiving unit, and performs a process required to test the mobile terminal;
a display unit that displays a test result;
frequency variation giving means for giving a predetermined frequency variation when a situation in which the mobile terminal that moves together with a high-speed moving body approaches or is separated from the base station is simulated to the downlink signal which is transmitted to the mobile terminal by the transmitting unit;
frequency variation detection means for, when the downlink signal to which the predetermined frequency variation is given is transmitted from the transmitting unit, receiving the baseband signal obtained by the receiving unit and detecting a frequency variation of the uplink signal;
frequency correction means for correcting a frequency of a local signal which is used by the receiving unit to obtain the baseband signal, on the basis of the frequency variation detected by the frequency variation detection means; and
variation characteristic display means for displaying, on the display unit, a characteristic of the frequency variation of the uplink signal that is transmitted from the mobile terminal in response to the downlink signal to which the predetermined frequency variation is given, on the basis of the frequency variation detected by the frequency variation detection means,
wherein the variation characteristic display means displays a characteristic of the predetermined frequency variation which is given to the downlink signal by the frequency variation giving means so as to be contrasted with the characteristic of the frequency variation of the uplink signal.

3. A mobile terminal test device comprising:
a transmitting/receiving unit including a transmitting unit that transmits a downlink signal to a mobile terminal to be tested and a receiving unit that receives an uplink signal output from the mobile terminal which has received the downlink signal and converts the uplink signal into a baseband signal;
a test processing unit that simulates a base station, transmits and receives signals to and from the mobile terminal through the transmitting/receiving unit, and performs a process required to test the mobile terminal;

a display unit that displays a test result;
frequency variation giving means for giving a predetermined frequency variation when a situation in which the mobile terminal that moves together with a high-speed moving body approaches or is separated from the base station is simulated to the downlink signal which is transmitted to the mobile terminal by the transmitting unit;
frequency variation detection means for, when the downlink signal to which the predetermined frequency variation is given is transmitted from the transmitting unit, receiving the baseband signal obtained by the receiving unit and detecting a frequency variation of the uplink signal;
frequency correction means for correcting a frequency of a local signal which is used by the receiving unit to obtain the baseband signal, on the basis of the frequency variation detected by the frequency variation detection means; and
variation characteristic display means for displaying, on the display unit, a characteristic of the frequency variation of the uplink signal that is transmitted from the mobile terminal in response to the downlink signal to which the predetermined frequency variation is given, on the basis of the frequency variation detected by the frequency variation detection means,
wherein the transmitting/receiving unit is configured to perform communication based on a CDMA system with the mobile terminal to be tested, and
the frequency variation detection means detects a frequency variation of a pilot signal in a specific channel among the baseband signals obtained by code inverse diffusion and a quadrature demodulation process in the receiving unit.

4. A mobile terminal test method comprising:
a step of transmitting, to a mobile terminal to be tested, a downlink signal to which a predetermined frequency variation when a situation in which the mobile terminal that moves together with a high-speed moving body approaches or is separated from a base station is simulated is given;
a step of receiving an uplink signal output from the mobile terminal that has received the downlink signal to which the predetermined frequency variation has been given and converting the uplink signal into a baseband signal;
a step of detecting a frequency variation of the uplink signal from the baseband signal;
a step of correcting a frequency of a local signal which is used to obtain the baseband signal, on the basis of the detected frequency variation; and
a step of for displaying a characteristic of the frequency variation of the uplink signal that is transmitted from the mobile terminal in response to the downlink signal to which the predetermined frequency variation is given, on the basis of the detected frequency variation,
wherein the step of correcting the frequency of the local signal corrects the frequency of the local signal at a first interval corresponding to a rate of the predetermined frequency variation when the predetermined frequency variation is given to the downlink signal and corrects the frequency of the local signal at a second interval which is longer than the first interval when the predetermined frequency variation is not given to the downlink signal.

5. A mobile terminal test method comprising:
a step of transmitting, to a mobile terminal to be tested, a downlink signal to which a predetermined frequency variation when a situation in which the mobile terminal that moves together with a high-speed moving body approaches or is separated from a base station is simulated is given;
a step of receiving an uplink signal output from the mobile terminal that has received the downlink signal to which the predetermined frequency variation has been given and converting the uplink signal into a baseband signal;
a step of detecting a frequency variation of the uplink signal from the baseband signal;
a step of correcting a frequency of a local signal which is used to obtain the baseband signal, on the basis of the detected frequency variation; and
a step of for displaying a characteristic of the frequency variation of the uplink signal that is transmitted from the mobile terminal in response to the downlink signal to which the predetermined frequency variation is given, on the basis of the detected frequency variation,
wherein the step of displaying the characteristic of the frequency variation of the uplink signal displays a characteristic of the predetermined frequency variation which is given to the downlink signal in the step of transmitting the downlink signal to the mobile terminal to be tested so as to be contrasted with the characteristic of the frequency variation of the uplink signal.

6. A mobile terminal test method comprising:
a step of transmitting, to a mobile terminal to be tested, a downlink signal to which a predetermined frequency variation when a situation in which the mobile terminal that moves together with a high-speed moving body approaches or is separated from a base station is simulated is given;
a step of receiving an uplink signal output from the mobile terminal that has received the downlink signal to which the predetermined frequency variation has been given and converting the uplink signal into a baseband signal;
a step of detecting a frequency variation of the uplink signal from the baseband signal;
a step of correcting a frequency of a local signal which is used to obtain the baseband signal, on the basis of the detected frequency variation; and
a step of for displaying a characteristic of the frequency variation of the uplink signal that is transmitted from the mobile terminal in response to the downlink signal to which the predetermined frequency variation is given, on the basis of the detected frequency variation,
wherein communication based on a CDMA system is performed with the mobile terminal to be tested, and
the step of detecting the frequency variation detects a frequency variation of a pilot signal in a specific channel among the baseband signals obtained by code inverse diffusion and a quadrature demodulation process.

* * * * *